(12) United States Patent
Allen et al.

(10) Patent No.: US 6,505,105 B2
(45) Date of Patent: Jan. 7, 2003

(54) ELECTRONIC CONTROL UNIT CALIBRATION

(75) Inventors: William James Allen, Carmel, IN (US); Ben Franklin McCormick, Fishers, IN (US); Kevin M. Gertiser, Noblesville, IN (US); Mark Thomas Lowden, Kokomo, IN (US); Paul M. Hay, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 237 days.

(21) Appl. No.: 09/755,636

(22) Filed: Jan. 5, 2001

(65) Prior Publication Data

US 2002/0091462 A1 Jul. 11, 2002

(51) Int. Cl.⁷ .............................................. G06F 19/00
(52) U.S. Cl. .......................... 701/33; 701/29; 700/170; 700/177
(58) Field of Search .............................. 701/33, 29, 35, 701/114, 115; 123/399, 481, 436, 506, 458; 700/170, 177

(56) References Cited

U.S. PATENT DOCUMENTS

| 4,478,193 | A | * | 10/1984 | Watanabe | 123/672 |
|---|---|---|---|---|---|
| 5,091,858 | A | * | 2/1992 | Paielli | 701/115 |
| 5,265,576 | A | * | 11/1993 | McMahon et al. | 123/458 |
| 5,394,327 | A | * | 2/1995 | Simon et al. | 701/1 |
| 5,445,126 | A | * | 8/1995 | Graves, Jr. | 123/399 |
| 5,477,827 | A | * | 12/1995 | Weisman et al. | 123/436 |
| 5,483,941 | A | * | 1/1996 | Cullen et al. | 123/481 |
| 6,308,121 | B1 | * | 10/2001 | Ulm | 701/35 |

* cited by examiner

*Primary Examiner*—Leo Picard
*Assistant Examiner*—Michael D. Masinick
(74) *Attorney, Agent, or Firm*—Jimmy L. Funke

(57) ABSTRACT

An electronic control unit (ECU) includes a microcontroller, a first non-volatile memory bank, a second non-volatile memory bank and a volatile memory. The microcontroller is coupled to an external tool and executes a control algorithm, which controls a subsystem coupled to the ECU. The first non-volatile memory bank is coupled to the microcontroller and initially stores a plurality of initial calibration tables. The second non-volatile memory bank and the volatile memory are also coupled to the microcontroller. The microcontroller executes code, which calibrates the ECU without interrupting the normal operation of the subsystem.

21 Claims, 3 Drawing Sheets

ELECTRONIC CONTROL UNIT CALIBRATION

TECHNICAL FIELD

The present invention is generally directed to an electronic control unit (ECU), and more specifically to the calibration of an ECU.

BACKGROUND OF THE INVENTION

Various generic control algorithms have been developed for use with automotive electronic control units (ECUs), within various automotive subsystems. For example, generic control algorithms have been developed for a variety of engine control units, power-train control units and antilock braking system (ABS) units, to name a few. Because these control algorithms are generic, the calibration constants must be calibrated for each particular application (e.g., to achieve a different performance level from the same engine provided in multiple motor vehicle models). These calibration constants have typically been stored in calibration tables within a non-volatile memory of each ECU. During development, these calibration constants have normally been modified by closed-loop computer equipment or by vehicle system engineers, known as calibration engineers, via an external tool (e.g. a PC coupled to the microcontroller), in an attempt to determine ideal values for the calibration constants. These ideal values have typically been determined by modifying one or more of the calibration constants while monitoring the overall effect on the performance of the particular automotive subsystem.

Traditionally, a number of approaches have been utilized to facilitate calibration of electronic control units (ECUs). These approaches have included: using a read-only memory (ROM) emulation device to store calibration constants external to the ECU; integrating a calibration emulation device, which stores calibration constants, internal to the ECU; and overlaying a non-volatile memory with a volatile memory (e.g., random access memory (RAM)), where the non-volatile memory permanently stores calibration constants and the volatile memory typically contains calibration constants that may be modified and both memories are internal to a microcontroller of the ECU.

However, these approaches have certain shortcomings. For example, providing a ROM emulation device external to the ECU requires a development ECU design that includes a robust test connector for providing access to a parallel data bus of a development microcontroller (so that the microcontroller can access the calibration constants stored in the ROM) in the external tool. One disadvantage of this approach is that the test connector generally requires a large area of the development ECU substrate and the design and production of the emulation device can be fairly expensive.

In an effort to reduce the cost associated with the external calibration emulation device, calibration emulation memory, which has normally been accessed via a serial bus, was placed internal to the development ECU. However, providing the calibration emulation memory internal to the ECU has generally required a development microcontroller design with additional memory (as compared to the production microcontroller design), which requires additional ECU substrate and additional microcontroller chip select resources.

In a further effort to reduce the internal memory requirements of the development microcontroller, designers have utilized internal volatile memory (i.e., RAM) to overlay internal non-volatile memory, such that calibration constants loaded into the internal volatile memory from the internal non-volatile memory could be modified through the use of an external tool. However, implementing overlay RAM internal to the microcontroller has also generally required additional internal microcontroller RAM to support glue logic such that the RAM can overlay a certain area of non-volatile (e.g., flash) memory. Further, the additional internal RAM has typically been difficult to manipulate with external tools and, because the internal RAM is typically small in size and volatile, all calibration data has been required to be uploaded to an external tool before being reprogrammed into the internal non-volatile memory of the ECU.

This reprogramming activity may corrupt valuable information, such as 'block learn', i.e., information that has been learned, and other data stored within the ECU memories. The data corruption is attributable to the fact that programming a non-volatile memory has generally required that a sector be erased, before new data can be programmed to the sector. Further, when the non-volatile memory was being reprogrammed, these ECUs could not control their associated automotive subsystems while reprogramming. Reprogramming times, when using a serial external tool, can typically range from five to twenty minutes.

An alternative to uploading the modified calibration constants to the external tool, for reprogramming into the non-volatile memory of the ECU, is to create a power supply device that constantly provides power to an internal volatile memory that contains the calibration constants. However, this approach can increase standby current drawn by the ECU, which may be unacceptable. As a result of the above considerations, the cost of a typical development ECU has been considerably greater than the cost of a production ECU.

Thus, what is needed is an electronic control unit (ECU) whose calibration constants can be updated in a relatively short time period, without interrupting the normal operation of the ECU. Further, it is desirable to provide a production ECU that can also serve as a development ECU.

SUMMARY OF THE INVENTION

The present invention is directed to the calibration of an electronic control unit (ECU) that includes a microcontroller, a first non-volatile memory bank, a second non-volatile memory bank and a volatile memory. During calibration, the microcontroller is coupled to an external tool that allows a user to modify calibration constants that the microcontroller uses to control a subsystem coupled to the ECU. The first non-volatile memory bank is coupled to the microcontroller and initially stores a plurality of initial calibration tables. The second non-volatile memory bank and the volatile memory are also coupled to the microcontroller. The microcontroller executes code, which causes the microcontroller to perform a number of steps.

Initially, the microcontroller loads a plurality of initial calibration tables into the second non-volatile memory bank. Next, the microcontroller receives an indication as to which of the calibration tables loaded in the second non-volatile memory bank are to be modified. Based upon the received indication, the microcontroller loads at least one of the calibration tables into the volatile memory. Then, the microcontroller replaces an existing calibration constant, located within one of the calibration tables, loaded in the volatile memory. The microcontroller then executes a control algorithm utilizing the calibration tables, including any replacement calibration constant, loaded in the volatile memory, when required for a particular calibration routine.

Next, the microcontroller receives an indication that the calibration tables currently loaded into the volatile memory are to be loaded into the second non-volatile memory bank. During the process, the microcontroller executes the control algorithm utilizing the calibration tables loaded into the first non-volatile memory bank, until the calibration tables in the volatile memory are loaded into the second non-volatile memory bank.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to an embodiment of the present invention, a working copy of a calibration data set is maintained in a working calibration area (e.g., a second non-volatile memory bank) of a non-volatile memory, which is located within an electronic control unit (ECU). This configuration obviates the need for transferring the calibration data set to an external tool (e.g., a personal computer (PC)) when a user of the external tool desires to permanently modify a calibration constant of one of the calibration tables of the calibration data set. According to the present invention, a volatile memory (e.g., a random access memory (RAM)), which is generally located within the microcontroller, is utilized to overlay a portion of the working calibration area such that the transfer of calibration constants between the overlay RAM and the working calibration area take place at the bus speed of the microcontroller. Further, transfers between the working calibration area and the reference calibration area (e.g., a first non-volatile memory bank) also take place at the bus speed of the microcontroller. This typically allows all tool functions to be realized in milliseconds without interruption of the ECU calibration process.

The present invention allows for calibration of the production ECU without impacting the ECU substrate design with additional memory devices, since the preferred memory device (i.e., a dual-bank flash memory) is utilized as the non-volatile memory of the production ECU. An ECU, according to the present invention, can readily be calibrated with an external tool since the ECU calibration process is not interrupted and calibration constants are transferred between memories internal to the ECU.

In a preferred embodiment, a RAM overlay is utilized in combination with a dual-bank flash memory device that has two separate banks (e.g., one and one-half megabyte and five-hundred twelve kilobytes) and a small sector size (e.g., eight to sixty-four kilobytes), which effectively allows the entire calibration area to be emulated. Since the calibration constants are stored within a working calibration area of the dual-bank flash memory, they are permanently stored within non-volatile memory and are not lost when power is removed from the ECU. Advantageously, the dual-bank flash memory does not require any modification to the ECU power supply and has essentially no impact on the ECU standby current. Further, the modified calibration constants, located within the RAM overlay, can be stored within the working calibration area while the control algorithms are executed using calibration constants from a reference calibration area. As such, the ECU can continue to perform normal control functions while the working calibration area is being reprogrammed, typically in milliseconds, which makes the changes to the calibration constants virtually transparent to a user of an external tool.

Figure 1:
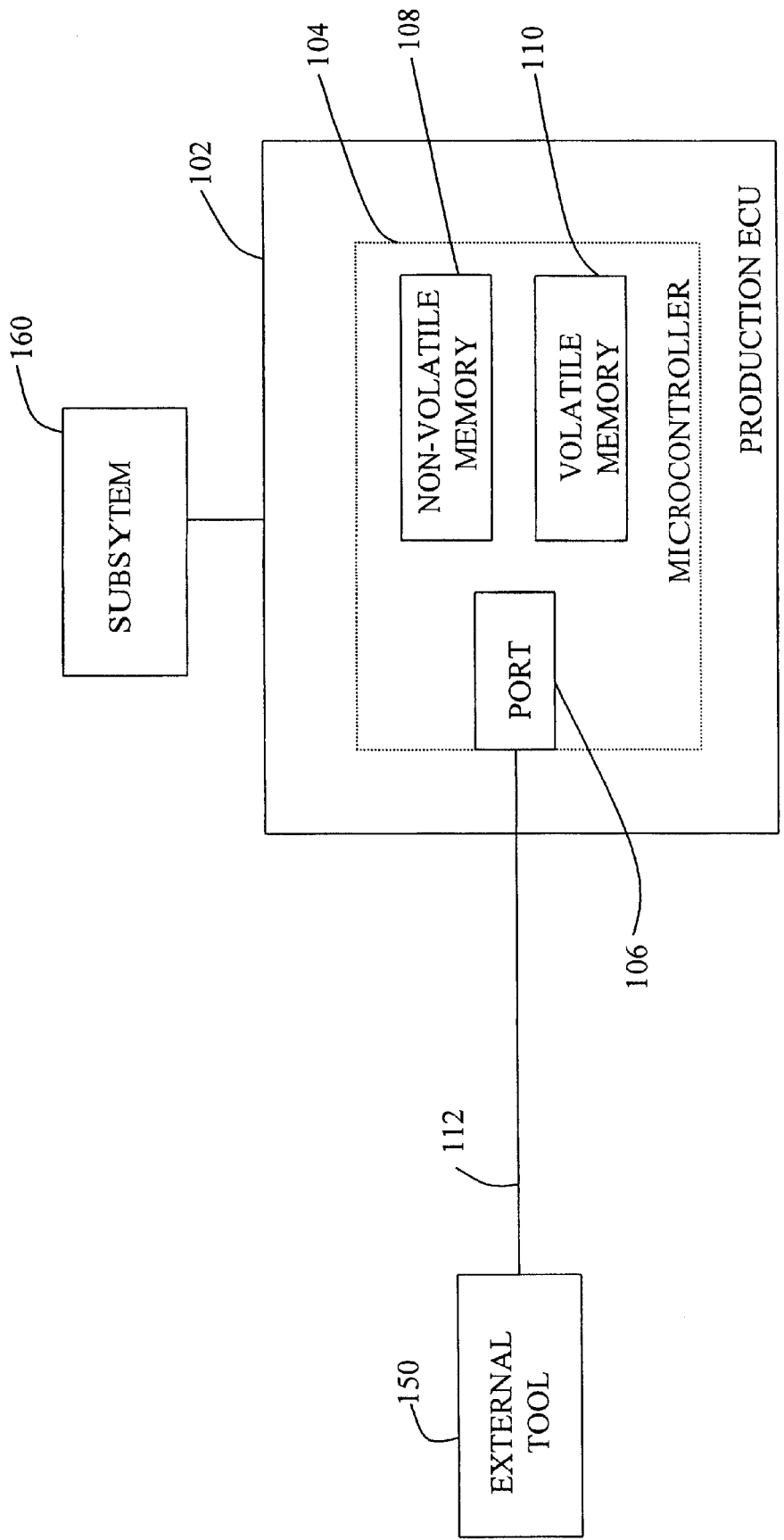
FIG. 1 is a block diagram of a production electronic control unit (ECU) communicating with an external tool, according to an embodiment of the present invention.

Referring to FIG. 1, a production electronic control unit (ECU) 102 is shown communicating with an external tool 150 and controlling a subsystem (e.g., an engine) 160 of a motor vehicle, according to an embodiment of the present invention. The external tool 150, e.g., a PC, executes a calibration application and is coupled, via a serial link 112, to a serial port 106 of a microcontroller 104 of the ECU 102. The microcontroller 104 includes a non-volatile memory 108 and a volatile memory 110. Preferably, the non-volatile memory 108 is a dual-bank flash memory. Dual-bank flash memory devices are manufactured and made commercially available by a variety of companies, e.g., Advanced Micro Devices. However, it will be appreciated that the non-volatile memory 108 can be implemented as two separate non-volatile (e.g., flash) memories and may exist external to the microcontroller 104. The volatile memory 110 is preferably a static random access memory (SRAM) whose size is application specific. The memory 110 is utilized, in part, to provide an overlay of a portion of the non-volatile memory 108, such that the calibration constants loaded into the volatile memory 110 can be modified, by a user of the external tool 150. When the calibration constants have been modified to provide a desired operation of the subsystem 160 coupled to the ECU 102, the calibration constants are stored in the non-volatile memory 108.

Figure 2:
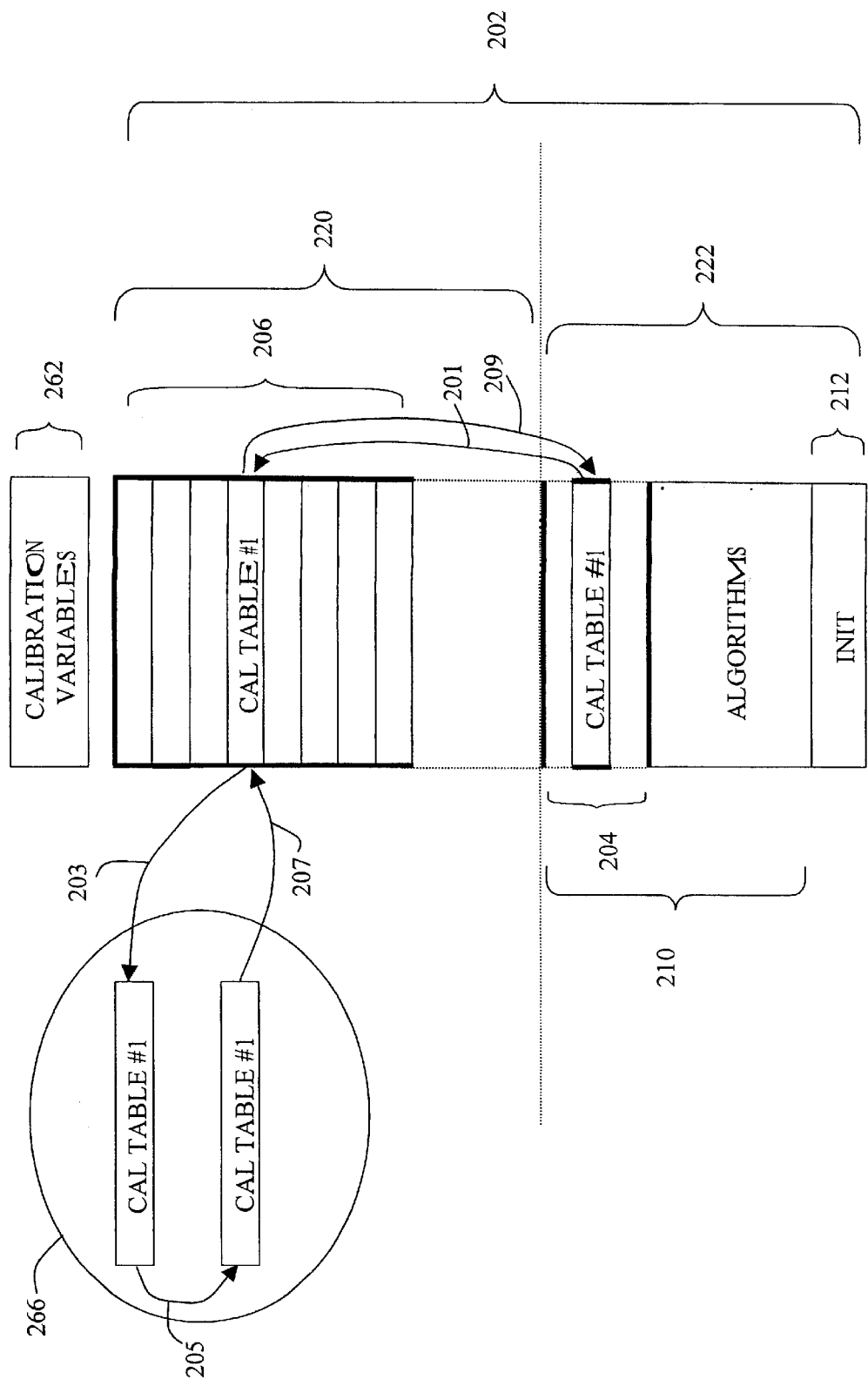
FIG. 2 is a diagram of a production ECU memory map implementing a volatile memory overlay of a portion of a dual-bank non-volatile memory, according to an embodiment of the present invention.

FIG. 2 illustrates a memory map of a portion of the memory of the production ECU 102 depicting a dual-bank flash memory 202, system RAM 262 and a RAM overlay 266, according to an embodiment of the present invention. In the following discussion, time estimates are based on a typical calibration bank size of ninety-six kilobytes, a sector size of eight kilobytes and a flash programming time of three-hundred milliseconds for a thirty-two kilobyte section. In a typical application, the calibration process is initiated when the external tool 150 requests, via the serial port 106, that the contents of a reference calibration area 204 be copied 201 to a working calibration area 206 and that upon completion of the task, the microcontroller 104 fetch a specific calibration table or tables from the working calibration area 206.

As depicted, the microcontroller 104 causes a selected calibration table (i.e., calibration table #1) to be loaded 203 into the RAM overlay 266. Since the external tool 150 simply initiates a process within the microcontroller 104, the relatively slow serial link 112, between the external tool 150 and the microcontroller 104, is not involved in the actual programming or reprogramming of the working memory bank 220. In the preferred embodiment, the flash device 202 has two separate memory banks: the working memory bank 220 and a reference memory bank 222. This allows the working memory bank 220 to be reprogrammed in the background while information (i.e., algorithms and calibration constants) in the main flash sector 210, of the reference memory bank 222, is accessed to run normal control algorithms. As previously discussed, instead of taking five to twenty minutes to accomplish the reprogramming task, the task can typically be achieved in approximately nine-hundred milliseconds.

In a preferred embodiment, a user selects a particular calibration table or tables to manipulate from a menu displayed on the tool 150. In response to a user selection, the tool 150 requests that a calibration table or tables be copied into the RAM overlay 266, which is initially located at a neutral address location. The task of copying a calibration table, from the working memory bank 220 to the RAM overlay 266, can typically occur in approximately eight-hundred microseconds, which varies depending on the size of the selected calibration tables. Next, the tool 150 enables the RAM overlay 266 by requesting that the RAM overlay 266 be moved over a desired portion of the working memory bank 220.

According to the present invention, the microcontroller 104 includes additional chip select logic that automatically disables the overlayed portion of the working memory bank 220, when the RAM overlay 266 is accessed. Then, the user, operating the tool 150, changes the calibration constant values 205 in the RAM overlay 266, while monitoring the calibration variable values in system RAM 262. The user can then select new calibration tables to be modified, which can cause the calibration tables that are currently within the RAM overlay 266 to be copied from the RAM overlay 266 to the working memory bank 220.

When the microcontroller 104 detects a power-down state or when a selected calibration table is located outside of the portion of the working memory bank 220 that is currently overlayed, the RAM overlay 266 is positioned to a neutral area. Next, the microcontroller 104 switches back to fetching data from the reference memory bank 222, while the contents of the RAM overlay 266 are transferred 207 into an appropriate portion of the working memory bank 220, which typically takes around seventy-five milliseconds. When the interruption is not caused by a power-down detection state, then new calibration tables are copied to the RAM overlay 266 and the RAM overlay 266 is then positioned over a new portion of the working memory bank 220. Next, at the direction of the user of the tool 150, the microcontroller 104 fetches various calibration tables, if available, from the portion of the RAM overlay 266. When the user has completed the calibration process, the final calibration constants are programmed 209 into the reference memory bank 222 or uploaded to the tool 150, via the serial link 112. As previously discussed, because a non-volatile memory is utilized, the ECU does not have to supply power to maintain the contents of the overlay RAM 266 during standby conditions.

Figure 3:
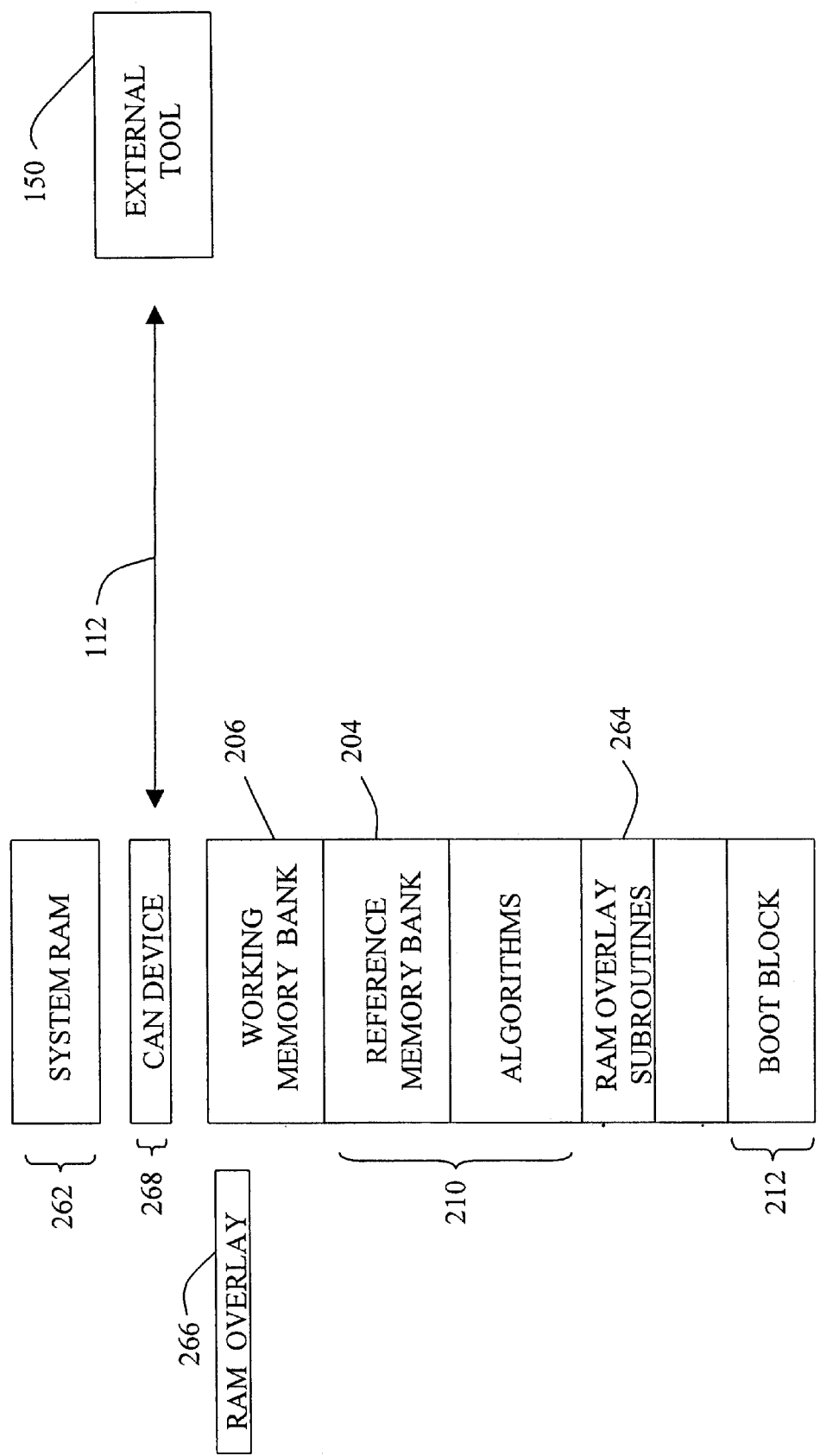
FIG. 3 is a diagram further illustrating the communication between an external tool and a production ECU memory map, according to an embodiment of the present invention.

FIG. 3 further illustrates the communication between the external tool 150 and the memory subsystem of a production ECU 102, according to an embodiment of the present invention. Communication between the tool 150 and the ECU 102, preferably, utilizes a controller area network (CAN) calibration protocol (CCP), which is facilitated by a CAN device driver 268. Preferably, two serial bus messages (i.e., GET_RAM_OVERLAY and SET_RAM_OVERLAY) are implemented to achieve calibration, according to the present invention. The GET_RAM_OVERLAY message originates from the tool 150, which uses the function to determine the status of any or all overlays when the current state is not known. Using the SET_RAM_OVERLAY message, the calibration tool directs the microcontroller 104 to copy data from the working memory bank 220 to the RAM overlay 266, set the base address of the RAM overlay 266 and enable/disable the RAM overlay 266. The RAM overlay subroutines 264, which implement the GET_RAM_OVERLAY and SET_RAM_OVERLAY functions advantageously allow the user of the tool 150 to calibrate the ECU 102 without any knowledge of how the internal ECU 102 calibration is being performed.

Accordingly, an automotive production electronic control unit (ECU), that can also serve as an automotive development ECU, has been described. The calibration constants of the production ECU can advantageously be updated in a relatively short time period, without interrupting the normal operation of the ECU.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method of calibrating an electronic control unit (ECU), comprising the steps of:

providing a control algorithm for controlling a microcontroller of an ECU, the microcontroller including a port for coupling the microcontroller to an external tool, the microcontroller executing a control algorithm which controls a subsystem coupled to the ECU;

loading a plurality of initial calibration tables into a first non-volatile memory bank;

loading the plurality of initial calibration tables into a second non-volatile memory bank;

receiving an indication from the external tool as to which of the calibration tables loaded in the second non-volatile memory bank are to be modified;

loading the indicated calibration tables into a volatile memory;

receiving a replacement calibration constant from the external tool, the replacement calibration constant replacing an existing calibration constant located within one of the calibration tables in the volatile memory;

executing the control algorithm utilizing the replacement calibration constant and the calibration tables in the volatile memory that are required for a particular calibration routine;

receiving an indication that the calibration tables currently in the volatile memory are to be loaded into the second non-volatile memory bank; and executing the control algorithm utilizing the calibration tables in the first non-volatile memory bank until the calibration tables in the volatile memory are loaded into the second non-volatile memory bank.

2. The method of claim 1, wherein the step of receiving an indication that the calibration tables currently in the volatile memory are to be loaded into the second non-volatile memory bank is provided in response to the receipt of a power-down request.

3. The method of claim 1, wherein the volatile memory provides a memory overlay for a portion of the second non-volatile memory bank.

4. The method of claim 3, wherein the step of receiving an indication that the calibration tables currently in the volatile memory are to be loaded into the second non-volatile memory bank is provided in response to a determination that a desired table in the second non-volatile memory bank cannot be accessed through the memory overlay.

5. The method of claim 1, wherein the volatile memory is a static random access memory and the first and second non-volatile memory banks are located within a dual-bank flash memory.

6. The method of claim 1, wherein the step of loading the plurality of initial calibration tables into the second non-volatile memory bank occurs at initialization.

7. The method of claim 1, wherein the volatile memory is a static random access memory and the first and second non-volatile memory banks are located within separate flash memories.

8. An electronic control unit (ECU), comprising:
- a microcontroller including a port for coupling the microcontroller to an external tool, the microcontroller executing a control algorithm which controls a subsystem coupled to the ECU;
- a first non-volatile memory bank coupled to the microcontroller, the first non-volatile memory bank initially storing a plurality of initial calibration tables;
- a second non-volatile memory bank coupled to the microcontroller;
- a volatile memory coupled to the microcontroller; and
- microcontroller executable code for causing the microcontroller to perform the steps of:
  - loading the plurality of initial calibration tables into the second non-volatile memory bank;
  - receiving an indication as to which of the calibration tables loaded in the second non-volatile memory bank are to be modified;
  - loading at least one of the calibration tables into the volatile memory according to the received indication;
  - receiving a replacement calibration constant to replace an existing calibration constant located within one of the calibration tables in the volatile memory;
  - executing the control algorithm utilizing the replacement calibration constant and the calibration tables in the volatile memory when required for a particular calibration routine;
  - receiving an indication that the calibration tables currently in the volatile memory are to be loaded into the second non-volatile memory bank; and
  - executing the control algorithm utilizing the calibration tables in the first non-volatile memory bank until the calibration tables in the volatile memory are loaded into the second non-volatile memory bank.

9. The electronic control unit of claim 8, wherein the step of receiving an indication that the calibration tables currently in the volatile memory are to be loaded into the second non-volatile memory bank is provided in response to the receipt of a power-down request.

10. The electronic control unit of claim 8, wherein the volatile memory provides a memory overlay for a portion of the second non-volatile memory bank.

11. The electronic control unit of claim 10, wherein the step of receiving an indication that the calibration tables currently in the volatile memory are to be loaded into the second non-volatile memory bank is provided in response to a determination that a desired calibration table in the second non-volatile memory bank cannot be accessed through the memory overlay.

12. The electronic control unit of claim 8, wherein the volatile memory is a static random access memory and the first and second non-volatile memory banks are located within a dual-bank flash memory.

13. The electronic control unit of claim 8, wherein the step of loading the plurality of initial calibration tables into the second non-volatile memory bank occurs at initialization.

14. The electronic control unit of claim 8, wherein the volatile memory is a static random access memory and the first and second non-volatile memory banks are located within separate flash memories.

15. A microcontroller, comprising:
- a port for coupling the microcontroller to an external tool, the microcontroller executing a control algorithm which controls a subsystem coupled to the microcontroller;
- a first non-volatile memory bank coupled to the microcontroller, the first non-volatile memory bank initially storing a plurality of initial calibration tables;
- a second non-volatile memory bank coupled to the microcontroller;
- a volatile memory coupled to the microcontroller; and
- microcontroller executable code for causing the microcontroller to perform the steps of:
  - loading the plurality of initial calibration tables into the second non-volatile memory bank;
  - receiving an indication as to which of the calibration tables loaded in the second non-volatile memory bank are to be modified;
  - loading at least one of the calibration tables into the volatile memory according to the received indication;
  - receiving a replacement calibration constant to replace an existing calibration constant located within one of the calibration tables in the volatile memory;
  - executing the control algorithm utilizing the replacement calibration constant and the calibration tables in the volatile memory when required for a particular calibration routine;
  - receiving an indication that the calibration tables currently in the volatile memory are to be loaded into the second non-volatile memory bank; and
  - executing the control algorithm utilizing the calibration tables in the first non-volatile memory bank until the calibration tables in the volatile memory are loaded into the second non-volatile memory bank.

16. The microcontroller of claim 15, wherein the step of receiving an indication that the calibration tables currently in the volatile memory are to be loaded into the second non-volatile memory bank is provided in response to the receipt of a power-down request.

17. The microcontroller of claim 15, wherein the volatile memory provides a memory overlay for a portion of the second non-volatile memory bank.

18. The microcontroller of claim 17, wherein the step of receiving an indication that the calibration tables currently in the volatile memory are to be loaded into the second non-volatile memory bank is provided in response to a determination that a desired calibration table in the second non-volatile memory bank cannot be accessed through the memory overlay.

19. The microcontroller of claim 15, wherein the volatile memory is a static random access memory (SRAM) and the first and second non-volatile memory banks are located within a dual-bank flash memory.

20. The microcontroller of claim 15, wherein the step of loading the plurality of initial calibration tables into the second non-volatile memory bank occurs at initialization.

21. The microcontroller of claim 15, wherein the volatile memory is a static random access memory and the first and second non-volatile memory banks are located within separate flash memories.

* * * * *